(12) United States Patent
Arscott et al.

(10) Patent No.: US 10,397,284 B2
(45) Date of Patent: Aug. 27, 2019

(54) SYSTEMS AND METHODS FOR AUTOMATIC RECONNECT OF CALLS

(71) Applicant: Google LLC, Mountain View, CA (US)

(72) Inventors: Simon Arscott, San Francisco, CA (US); Sailesh Nepal, Santa Clara, CA (US); Laura Holmes, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1052 days.

(21) Appl. No.: 14/812,987

(22) Filed: Jul. 29, 2015

(65) Prior Publication Data
US 2017/0034223 A1 Feb. 2, 2017

(51) Int. Cl.
H04L 29/06 (2006.01)
H04L 29/08 (2006.01)
(Continued)

(52) U.S. Cl.
CPC ...... *H04L 65/1069* (2013.01); *H04L 43/0823* (2013.01); *H04L 65/1006* (2013.01); *H04L 65/1046* (2013.01); *H04L 65/1063* (2013.01); *H04L 65/1066* (2013.01); *H04L 65/1083* (2013.01); *H04L 65/403* (2013.01); *H04L 67/303* (2013.01); *H04L 67/306* (2013.01); *H04L 67/327* (2013.01); *H04L 69/40* (2013.01); *H04W 76/19* (2018.02)

(58) Field of Classification Search
CPC ... H04L 67/403; H04L 67/406; H04L 67/327; H04L 65/1006; H04L 65/1046; H04L 65/1066; H04L 65/1069; H04L 65/1083; H04L 65/403; H04L 69/40; H04W 76/19
See application file for complete search history.

(56) References Cited

U.S. PATENT DOCUMENTS

| 7,974,610 B2 | 7/2011 | Nachum |
| 8,831,591 B2 | 9/2014 | Kotecha et al. |

(Continued)

FOREIGN PATENT DOCUMENTS

| JP | 2002-077186 A | 3/2002 | |
| JP | 2002077186 A * | 3/2002 | ............ H04L 12/28 |

(Continued)

OTHER PUBLICATIONS

Reliance, "Call Management Services," Jan. 2012, downloaded from http://www.rcom.co.in/Rcom/personal/prepaid/cms.html on Apr. 30, 2015.

(Continued)

*Primary Examiner* — Paul H Masur
(74) *Attorney, Agent, or Firm* — Honigman LLP

(57) ABSTRACT

A system and method are provided for recovering a communication session between a client device and a participant device is performed by a server running a central service. The server detects that the client device has lost connection to the participant device and proceeds to maintain the connection to the participant device. In certain embodiments, the server determines why the client device lost connection and selects a second device in close proximity to the client device using information from a user profile associated with the client device. The server then proceeds to establish a connection between the client device and the participant device.

25 Claims, 7 Drawing Sheets

(51) Int. Cl.
*H04L 29/14* (2006.01)
*H04W 76/19* (2018.01)
*H04L 12/26* (2006.01)

(56) References Cited

U.S. PATENT DOCUMENTS

| | | | | |
|---|---|---|---|---|
| 2008/0120427 | A1* | 5/2008 | Ramanathan | H04L 51/04 709/230 |
| 2008/0310611 | A1* | 12/2008 | Moriwaki | H04W 36/0033 379/212.01 |
| 2009/0157799 | A1* | 6/2009 | Sukumaran | G06Q 10/10 709/203 |
| 2012/0265807 | A1* | 10/2012 | Kowalewski | H04L 65/1016 709/204 |
| 2012/0290657 | A1* | 11/2012 | Parks | G06F 9/4856 709/204 |
| 2012/0290663 | A1* | 11/2012 | Hsieh | G06F 9/4856 709/206 |
| 2015/0055446 | A1 | 2/2015 | Avula et al. | |
| 2015/0113048 | A1* | 4/2015 | Limburn | H04L 67/24 709/203 |
| 2015/0215832 | A1 | 7/2015 | Fitzpatrick | |
| 2015/0381740 | A1* | 12/2015 | Gwin | H04L 67/142 709/228 |
| 2018/0136984 | A1* | 5/2018 | Paola | H04L 67/1008 |

FOREIGN PATENT DOCUMENTS

| | | |
|---|---|---|
| JP | 2007-174205 A | 7/2007 |
| JP | 2014-116759 A | 6/2014 |

OTHER PUBLICATIONS

Japanese Office Action for the related Application No. 2017-556896 dated Oct. 2, 2018 with its English translation thereof.
International Preliminary Report on Patentability from International Application No. PCT/US2016/042164, dated Feb. 8, 2018, 11 pp.
International Search Report and Written Opinion of International Application No. PCT/US2016/042164, dated Oct. 24, 2016, 14 pp.

* cited by examiner

SYSTEMS AND METHODS FOR AUTOMATIC RECONNECT OF CALLS

BACKGROUND

This disclosure relates to telecommunication services. Telecommunication takes many forms, for example, signal exchange over a physical medium such as telephone cables, and signal exchange through electromagnetic waves. Telecommunication involves at least two entities and is ubiquitous in the age of mobile telephone devices that allow voice communication between two or more entities. An inconvenience in mobile voice communication occurs when a phone conversation is terminated due to a participant in the conversation suffering from an unreliable signal quality. In conventional systems, the user whose connection is at issue will have to re-dial the other individual. The moment of low signal integrity that led to the disconnection may have only lasted a few seconds, but the effort to re-dial and successfully reconnect with the other individual may take minutes, especially when the other individual is re-dialing as well.

SUMMARY

One embodiment of the disclosure provides a method for restoring a communication session between a client device and a participant device. The method includes: detecting, by a server device running a central service, that the client device has lost connection to the participant device; maintaining a network connection to the participant device; retrieving, from a database, a user profile and device statistics associated with the client device; selecting a second device in close proximity to the client device using information from the user profile and the device statistics; and, restoring the communication session between the second device and the participant device.

Another embodiment of the disclosure provides a server configured as a central service conducting a communication session and configured to coordinate messages in the communication session. The server includes: at least one network interface configured to communicatively couple the server to a plurality of communication networks; and, at least one processor configured to: store, retrieve, and analyze network, device, and user profile parameters in a database; maintain a connection to at least one device when another device is no longer active on the communication session; provide a connection to a second device; and, collect and sort parameters pertaining to the communication session and devices participating in the communication session.

Another embodiment of the disclosure provides a non-transitory computer readable storage device for recovering a communication session between a client device and a participant device, the computer readable storage device having computer executable instructions for performing the steps of: determining that the client device has been dropped from the communication session; maintaining a network connection to the participant device at a server interposed between the client device and the participant device; retrieving by the server a user profile and device parameters associated with the client device; selecting a second device in close proximity to the client device using information from the user profile and the device parameters; and, restoring the communication session between the second device and the participant device.

DETAILED DESCRIPTION

Figure 1:
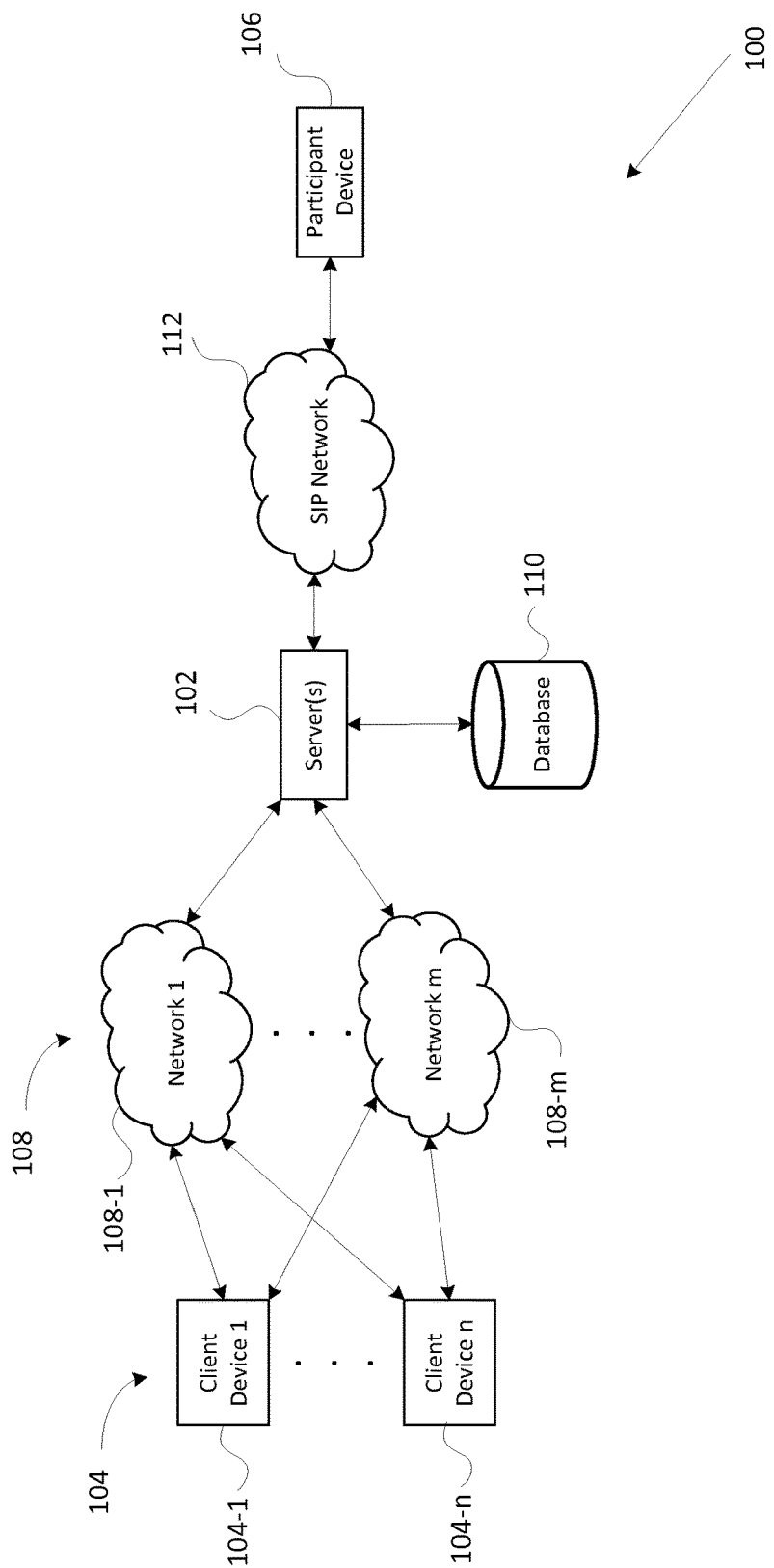
FIG. 1 is a block diagram illustrating a communication system in accordance with some example embodiments.

The present disclosure relates to maintaining a communication session that has been disconnected. This feature is especially important since, for example, in mobile telephony, users on the move are expected to have less than ideal network coverage throughout the length of a phone conversation. In one instance, the user may be carrying out a conversation while driving to work, and along the way, the user may pass thorough areas with spotty coverage that result in the call being disconnected. In another scenario, the user may be driving through a tunnel and gets disconnected. Yet in another scenario, the user may be on a video call on his/her computer and gets disconnected. Therefore, methods and services that maintain a call are valuable.

According to various embodiments, a communication session can be a telephone call over the PSTN (public switched telephone network), a cellular telephone call, a voice call over IP (Internet Protocol), and/or a voice and video call over IP, and the like. According to various embodiments, when first and second users are engaged in a communication session over a network, the first user may be disconnected from the communication session. A system and method are described herein for keeping the communication session connected on a server side when the first user is disconnected for any reason. When the first user is disconnected, instead of terminating the communication session, the server that manages the communication session maintains the connection to the second user until the first user is available.

Examples of a network include mobile or cellular networks using multiple encodings, e.g., code division multiple access (CDMA), time division multiple access (TDMA), Global System for Mobile Communications (GSM), etc. The network is not limited to only cellular networks but includes any network that supports voice or video communication. Additionally, the network may include a plurality of network types and connectivity types between the first and second users. The server in certain embodiments comprises at least one computing device that supports and provides services for voice and/or video communication between the first and second users.

In some embodiments, the communication session may be a conference call between the first user and multiple other users. In one example, when the first user leaves a coverage area or is dropped from the communication session, the conference call is still on-going, allowing the first user to reconnect when the first user re-enters the coverage area.

In certain embodiments, the first user may be moving through multiple network coverage areas with areas of no signal in-between the different coverage areas. The movement from one coverage area to another coverage area is detected by the server, which will then maintain the connection to the second user and provide the first user with the ability to automatically reconnect to the existing connection. In certain embodiments, the first user can dial a specific phone number to reconnect to the communication session. In certain embodiments, the specific phone number is associated with a user account or communication service, and in the event of a disconnection, when the specific phone number is called, a password or code is required in order to join the active communication session. In some embodiments, the first user is able to reconnect via a software service provided by the server upon initial connection to the communication session. In certain embodiments, the first user is able to reconnect through text message, e-mail, or multimedia messaging service (MMS), as described in greater detail herein.

In certain embodiments, the server determines through user historic movement patterns that the first user is likely to lose connection at some time in the future. By anticipating the first user's connectivity issues, the server maintains connectivity with the second user after the first user is disconnected. The first user can then reconnect to the existing communication session with the second user once the first user regains a better reception. In certain embodiments, the server decides to disconnect the first user from the communication session preemptively because the server detects that the first user is on a mobile device that is running out of battery. The server then seeks another device associated with first user in close proximity to the first user, and connects the other device to the active communication session. In certain embodiments, the other device is chosen from a list of devices associated with the first user's profile. The other device can be one of a mobile phone, a smart phone, a land line, a personal digital assistant (PDA), a mobile computer, a desktop computer, or any other device capable of voice or video communication over a network.

In certain embodiments, the server determines through user movement patterns that the first user will lose connection to the communications session. The server proceeds to play an audio message or send text or email messages to the first user, providing an alternate route that will avoid the first user losing connection.

In certain embodiments, when the first user is disconnected, the second user proceeds to hang up. When the second user hangs up, the communication session is terminated, and the server does not attempt to reconnect the first user.

In certain embodiments, when the first user is disconnected, the second user is presented with the option to leave a message for the first user. If the second user elects to take this option and proceeds to leave a message for the first user, then the server does not attempt to reconnect the first user. The second user's message is made available in the first user's mailbox. An example of the first user's mailbox includes a voicemail system. A transcribed voice message may also be sent to the first user's email address, or a transcribed message may be sent to the first user through multimedia messaging service (MMS) or short message service (SMS), etc.

In certain embodiments, when the first user is disconnected from the communication session, the server provides a message to the second user in order to inform the second user that the first user is in an area with no coverage. The message may be an audio message that is one of a voice message, music, a beep, series of beeps, or other types of sound indicators. The message may also be text-based, that is, an email, multimedia message, or text message, among others. The second user then has the option to wait for the first user to be joined to the active connection, leave a message for the first user, or hang up. The server maintains connection with the second user until the first user is reconnected, the communication session is idle for a predefined timeout, or the second user hangs up.

FIG. 1 is a block diagram of a communication system 100 in accordance with certain embodiments of the disclosure. The system 100 includes a server or cluster of servers 102, one or more client devices labeled 104-1 through 104-n, a participant device 106, several network connections linking client devices 104-1 through 104-n to server(s) 102, the network connections labeled 108-1 through 108-m, one or more databases 110, a network connection 112 between the server(s) 102 and the participant device 106. The network connection 112 is shown, for example, as a Session Initiation Protocol (SIP) network but may be a network of any kind.

The client device or plurality of client devices 104 and the participant device 106 can be any type of communication devices that support voice or video communication, including a telephone, a mobile phone, a smart phone, a personal computer, a laptop computer, a smart watch, a picture frame with a transmitter and microphone, a smart television, a video game system, a personal digital assistant (PDA), a wearable or embedded digital device(s), etc. In some embodiments, the client devices 104 and participant device 106 can support multiple types of networks. For example, the client devices 104 and the participant device 106 may have WiFi connectivity allowing voice calls over the internet using voice over IP (VoIP) or may have mobile network connectivity allowing voice calls over cellular and data networks.

Figures 2, 3:
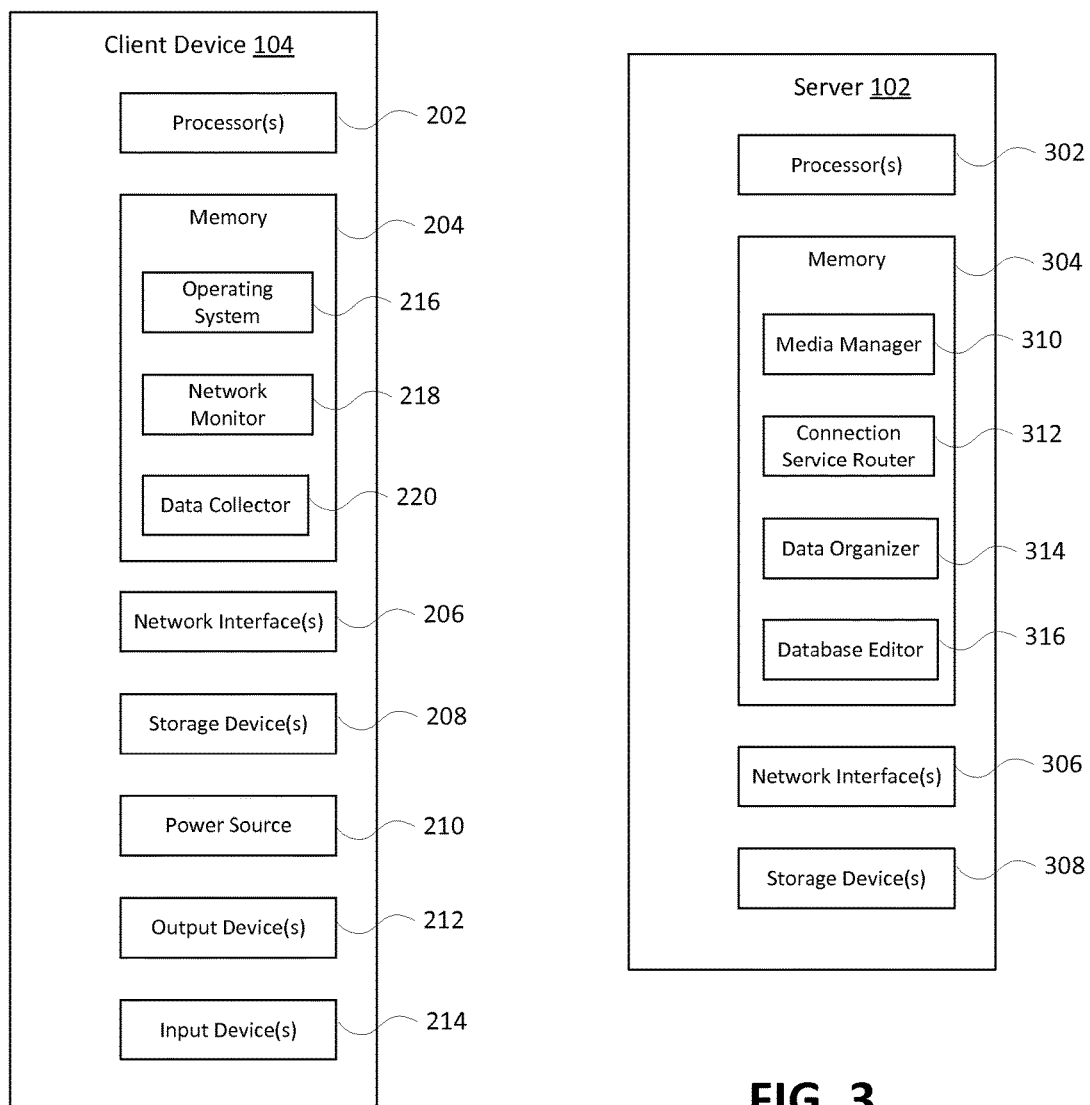
FIG. 2 is a block diagram illustrating components of a client device from the system illustrated in FIG. 1 according to some example embodiments.
FIG. 3 is a block diagram illustrating components for a server from the system illustrated in FIG. 1 according to some example embodiments.

FIG. 2 is a block diagram of basic functional components for a client device 104 according to some aspects of the disclosure. In the illustrated embodiment of FIG. 2, the client device 104 includes one or more processors 202, memory 204, network interfaces 206, storage devices 208, power source 210, one or more output devices 212, one or more input devices 214, and software modules—operating system 216, a network monitor 218, and a data collector 220—contained in memory 204. The software modules are provided as being contained in memory 204, but in certain embodiments, the software modules are contained in storage devices 208 or a combination of memory 204 and storage devices 208. Each of the components including the processor 202, memory 204, network interfaces 206, storage devices 208, power source 210, output devices 212, input devices 214, operating system 216, the network monitor 218, and the data collector 220 is interconnected physically, communicatively, and/or operatively for inter-component communications.

As illustrated, processor 202 is configured to implement functionality and/or process instructions for execution within client device 104. For example, processor 202 executes instructions stored in memory 204 or instructions stored on a storage device 208. Memory 204, which may be a non-transient, computer-readable storage medium, is configured to store information within client device 104 during operation. In some embodiments, memory 204 includes a temporary memory, an area for information not to be maintained when the client device 104 is turned off. Examples of such temporary memory include volatile memories such as random access memories (RAM), dynamic random access memories (DRAM), and static random access memories (SRAM). Memory 204 also maintains program instructions for execution by the processor 202.

Storage device 208 also includes one or more non-transient computer-readable storage media. The storage device 208 is generally configured to store larger amounts of information than memory 204. The storage device 208 may further be configured for long-term storage of information. In some embodiments, the storage device 208 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

Client device 104 uses network interface 206 to communicate with external devices or server(s) 102 via one or more networks 108 (see FIG. 1), and other types of networks through which a communication with the client device 104 may be established. Network interface 206 may be a network interface card, such as an Ethernet card, an optical transceiver, a radio frequency transceiver, or any other type of device that can send and receive information. Other non-limiting examples of network interfaces include Bluetooth®, 3G and Wi-Fi radios in client computing devices, and Universal Serial Bus (USB).

Client device 104 includes one or more power sources 210 to provide power to the device. Non-limiting examples of power source 210 include single-use power sources, rechargeable power sources, and/or power sources developed from nickel-cadmium, lithium-ion, or other suitable material.

One or more output devices 212 are also included in client device 104. Output devices 212 are configured to provide output to a user using tactile, audio, and/or video stimuli. Output device 212 may include a display screen (part of the presence-sensitive screen), a sound card, a video graphics adapter card, or any other type of device for converting a signal into an appropriate form understandable to humans or machines. Additional examples of output device 212 include a speaker such as headphones, a cathode ray tube (CRT) monitor, a liquid crystal display (LCD), or any other type of device that can generate intelligible output to a user.

The client device 104 includes one or more input devices 214. Input devices 214 are configured to receive input from a user or a surrounding environment of the user through tactile, audio, and/or video feedback. Non-limiting examples of input device 214 include a presence-sensitive screen, a mouse, a keyboard, a voice responsive system, video camera, microphone or any other type of input device. In some examples, a presence-sensitive screen includes a touch-sensitive screen.

The client device 104 includes an operating system 216. The operating system 216 controls operations of the components of the client device 104. For example, the operating system 216 facilitates the interaction of the processor(s) 202, memory 204, network interface 206, storage device(s) 208, input device 214, output device 212, and power source 210.

The client device 104 uses network monitor 218 to determine a geographic location of the client device 104. The network monitor 218 may interface with and receive inputs from a GPS transceiver, or the network monitor 218 may be a state of the processor 202, which is defined by a series of instructions stored on the memory 204 or storage device 208 that when executed cause the processor 202 to triangulate a geographic location of the client device 104 based on any available network connections.

In certain embodiments of the disclosure, client device 104 further includes a data collector 220. In certain embodiments, the data collector 220 represents various states of the processor 202, and is defined by program instructions and/or data stored on the memory 204 or the storage device 208. The data collector 220 configures the client device 104 to collect network quality parameters, device parameters, and the location data from network 108 (see FIG. 1). Once the quality parameters and other information are collected for an individual wireless network, then the data collector 220 configures the client device 104 to upload, to the server 102 (see FIG. 1), the parameters collected and location data pertaining to a location of the client device 108 when the quality parameters were collected.

The various networks 108 are a connectivity methodology and may take the form of multiple topologies. For example, network 108 comprises wireless and wired networks. Network 108 links the server 102 and the user devices 104. Network 108 includes infrastructure that supports the links necessary for voice communication between at least one user device and a participant device. Network 108 may include a cell tower, base station, and switching network.

Server(s) 102 is at least one machine that provides operation management and services to a voice or video communication session between the participant device 106 and one user device 104. The server has access to multiple databases 110 and other facilities that enable the features described herein.

According to certain embodiments, similar elements shown in FIG. 2 to be included in the client device 104 can also be included in the participant device 106.

Turning to FIG. 3, a block diagram illustrating components for a server 102 is provided according to certain aspects of the disclosure. Server 102 includes one or more processors 302, memory 304, network interface(s) 306, storage device(s) 308, and software modules—media manager 310, connection service router 312, data organizer 314, and database editor 316—contained in memory 304. The software modules are provided as being contained in memory 304, but in certain embodiments, the software modules are contained in storage devices 308 or a combination of memory 304 and storage devices 308. In certain embodiments, each of the components including the processor(s) 302, memory 304, network interface(s) 306, storage device(s) 308, media manager 310, connection service router 312, data organizer 314, and database editor 316 are interconnected physically, communicatively, and/or operatively for inter-component communications.

Processor(s) 302, analogous to processor(s) 202 in client device 104, is configured to implement functionality and/or process instructions for execution within the server 102. For example, processor(s) 302 executes instructions stored in memory 304 or instructions stored on storage devices 308. Memory 304, which may be a non-transient, computer-readable storage medium, is configured to store information within server 102 during operation. In some embodiments, memory 304 includes a temporary memory, i.e. an area for information not to be maintained when the server 102 is turned off. Examples of such temporary memory include volatile memories such as random access memories (RAM), dynamic random access memories (DRAM), and static random access memories (SRAM). Memory 304 also maintains program instructions for execution by processor(s) 302.

Server 102 uses network interface(s) 306 to communicate with external devices via one or more networks depicted as network 108 and SIP network 112 in FIG. 1. Such networks may also include one or more wireless networks, wired networks, fiber optics networks, and other types of networks through which communication between the server 102 and an external device may be established. Network interface(s) 306 may be a network interface card, such as an Ethernet card, an optical transceiver, a radio frequency transceiver, or any other type of device that can send and receive information.

Storage devices 308 in server 102 also include one or more non-transient computer-readable storage media. Storage devices 308 are generally configured to store larger amounts of information than memory 304. Storage devices 308 may further be configured for long-term storage of information. In some examples, storage devices 304 include non-volatile storage elements. Non-limiting examples of non-volatile storage elements include magnetic hard discs, optical discs, floppy discs, flash memories, resistive memories, or forms of electrically programmable memories (EPROM) or electrically erasable and programmable (EEPROM) memories.

Server 102 further includes instructions that implement media manager 310 which is configured to provide media services to client device 104 or participant device 106. Media manager 310 manages providing SMS, MMS, and email messages in connection with alerting the external devices of information relating to the status of a call. For example, media manager 310 provides a prompt to participant device 106 soliciting a voice or video message when client device 104 is dropped from a communication session. Media manager 310 also provides media service in cases where client device 104 receives guidance to stay within a certain area in order to avoid losing connection to the communication session. In certain embodiments, media manager 310 facilitates communication between client device 104 and participant device 106. For example, media manager 310 filters, compresses, and encrypts voice or video data destined for each external device. In certain embodiments, when participant device 106 elects to leave a voice message, media manager 310 is further configured to transcribe the voice message, package, and send it to an email address. The transcribed voice message may be an email attachment or an email body. In certain aspects where the transcribed voice message is an email body, an attachment of the voice message may be included in the email. In certain embodiments, instead of email, an SMS or MMS format message may be composed and sent to at least one client device 104. The manner to which voice messages are delivered to a disconnected user may be configured in preference settings of the user's profile.

Connection service router 312 is configured to manage the connection between client device 104 and participant device 106. When client device 104 sends a communication signal to server(s) 102 in order to initiate a communication session with participant device 106, connection service router 312 is configured to route client device 104 to appropriate participant device 106 based on the received communication signal. In certain embodiments, connection service router 312 is further configured to prepare and provide a software service for auto-connecting client device 104 in the event client device 104 is disconnected from the communication session. For example, client device 104-1 is a smart phone in a communication session with participant device 106. Connection service router 312 may provide or activate a software service running on client device 104-1 or a default second client device 104-3 that will cause one of the devices to send a communication signal to server(s) 102 in the event client 104-1 is disconnected from the communication session. In certain aspects of the disclosure, connection service router 312 is further configured to prepare a distinct identifier or number for the communication session between client device 104 and participant device 106. Connection service router 312 then provides the distinct number or identifier to media manager 310 for packaging and sending to client device 104.

The data organizer 314 configures server(s) 102 to organize device and network parameters from the plurality of networks 108 (see FIG. 1) sent by the plurality of client devices 104. Client devices 104 are configured to upload, to the server 102, collected location information, when the device and network parameters were collected, and the actual parameters collected. The data organizer 314 will associate the received location information with the reported parameters such that the location information from the client device 104 is associated with corresponding device and network parameters. The data organizer 314 further associates a timestamp with the received location information and collected parameters. In certain embodiments, the timestamp is received from the client device 104; however, in other embodiments, the timestamp is produced by the server 102. The data organizer 314 is further configured to aggregate all of the received device and network parameters per location and per timestamp.

The database editor 316 configures the server 102 to build a database entry for each client device 104 associated with a user account during specific time windows. The database entries are stored in database 110. In certain embodiments, for each specific time window, the database editor 316 will specify a default second client device to make a connection to in case client device 104 is dropped from the communication session. The default second client device is determined by analyzing the parameters collected by the data organizer 314. In certain embodiments, the default second client device is determined by selecting a device closest in proximity to client device 104. In certain embodiments, the capabilities of the device is taken into account. For example, if a video communication session is ongoing with client device 104-1, the default second client device may be chosen as client device 104-2 which has the capability of providing and maintaining video calls. In certain embodiments, the performance characteristics of the second device are taken into account. For example, the network interface 206 of one device may have a higher speed than another device.

Figure 4:
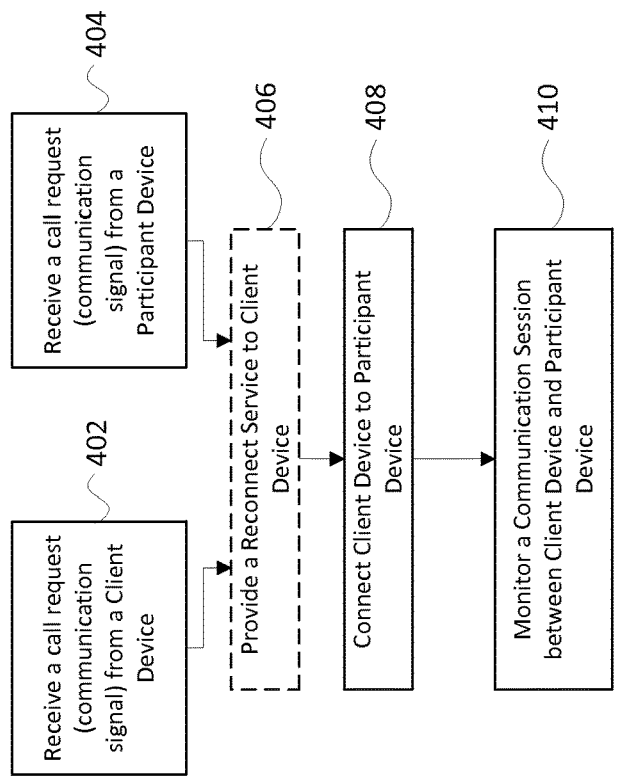
FIG. 4 is a flow diagram in accordance to certain embodiments providing the steps performed by a server or cluster of servers to connect two devices in a communication session.

FIG. 4 provides steps for establishing a communication session performed by server(s) 102 in accordance to some embodiments of the disclosure. Steps 402 and 404 show that the voice or video communication session may be requested from either a client device 104 or a participant device 106, respectively. In certain aspects of the disclosure, server(s) 102 obtains a request to establish a communication session from client device 104 in step 402. In certain embodiments, server(s) 102 may provide a reconnect service to client device 104 as depicted in step 406. Some examples of a reconnect service includes: starting a software service on client device 104 that contains credentials and program that automatically dials into or attempts to reconnect to the communication session when disconnect; an SMS, email, or MMS that contains a distinct number for the user to call in case a disconnection occurs; an SMS, email, MMS, or sound media that contains a PIN, password, or passcode associated with the communication session. In step 408, server(s) 102 connects client device 104 to participant device 106 and establishes a communication session. After step 408, client device 104 and participant device 106 may exchange information though the communication session. At step 410, server(s) monitors the communication session between the client device and the participant device. Server(s) 102 collects information pertaining to the call.

Figure 5:
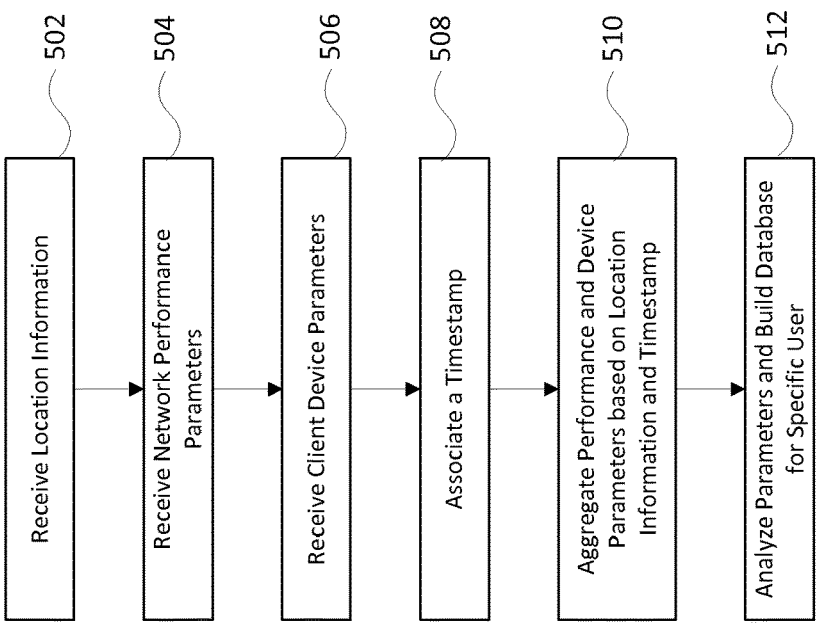
FIG. 5 is a flow diagram for data collection and building a database at a server in accordance with some example embodiments.

FIG. 5 provides an example of how server(s) 102 collects and packages information with respect to certain embodiments of the disclosure. In step 502, server(s) 102 receives location information from client device 104. In certain embodiments, server(s) 102 receives multiple location information from a plurality of client devices 104 not involved in the communication session. In certain embodiments, the server uses the location information from the plurality of client devices not involved in the communication session in order to compile a ranking for choosing a client device 104 to connect to in the event of a disconnect with the already connected client device 104. For example, if client device 104-1 is engaged in a communication session with participant device 106, server(s) 102 may receive location data from client devices 104-2 through 104-9. Additionally, server(s) 102 may determine based on the location of the client devices 104-1 to 104-9 that client device 104-5 is the closest device to client device 104-1. In step 502, location information may also be obtained from a database 110 for client devices not currently active on a network. For example, client device 104-9 is designated as a landline telephone with a specific, permanent location.

In step 504, server(s) receives network performance parameters from the plurality of client devices 104. In certain embodiments, server(s) receives network performance parameters from intermediate devices, nodes, and machines between the client devices 104 and server(s) 102. For example, server(s) may receive coverage data from a set of base stations or other servers and databases associated with a cellular connection. In step 506, server(s) receives client device 104 parameters. In certain embodiments, client device parameters include battery life, signal strength, data speeds, processor speed, etc. At step 508, a timestamp is associated with the location information, received network performance parameters, and the received client device parameters. The timestamp indicates a time when the data, comprising the location information and the parameters, was collected by the collected by the client devices 104 or received by the server(s) 102. If a timestamp represents the time when the data was collected by the client device, then the timestamp is applied by the client device 104 and sent along with the data to the server(s) 102. If the timestamp represents the time when the data was received by the server(s) 102, then the timestamp was applied by the server(s) 102 when the data was received.

In step 510, server(s) 102 aggregate performance and device parameters based on location information and timestamp. Aggregation of the information from a plurality of client devices 104 provides performance and associated network parameters that are sorted based on the location they were collected from and a time during which they were collected/uploaded by the client device 104 or received by server(s) 102. At step 512, server(s) 102 analyzes the aggregated parameters and builds or updates database 110 entries for the user associated with the client devices 104. In certain embodiments, the updates or changes to database 110 also changes one or more parameters in a user profile associated with the user.

Figure 6:
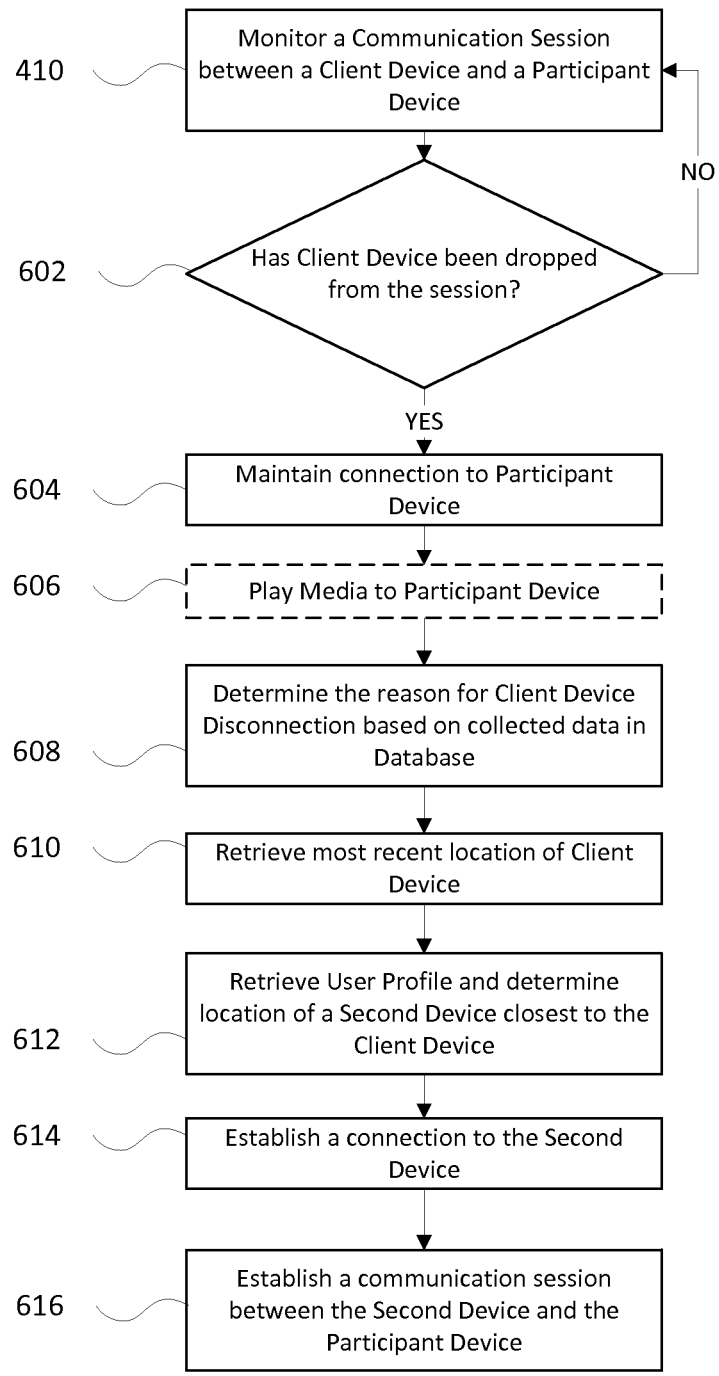
FIG. 6 is a flow diagram of method steps performed by a server or cluster of servers for reconnecting a second device with the communication session in accordance with some example embodiments.

FIG. 6 is a flow diagram illustrating steps performed by a server or cluster of servers for reconnecting a second device with the communication session in accordance with some example embodiments. Once a participant device 106 and a client device 104 are in a communication session, in step 410, server(s) 102 monitors the communication session between both devices. In step 602, server(s) 102 determines whether client device 104 has been dropped from the communication session. In the event that the client device 104 suddenly drops from the communication session, in step 604, the server(s) 102 maintains connection to the participant device 106 and prevents the participant device 106 from disconnecting. The connection maintained is the active communication channel that existed between the client device 104 and participant device 106. In certain embodiments, at step 606, server(s) 102 plays a media message to participant device 106. In certain instances, the media message may be in text or email form. The media message may inform participant device 106 that client device 104 is disconnected. The media message may also provide a participant device 106 with a timeout, a waiting period client device 104 has to reconnect before the communication session is terminated. The media message may also provide a prompt for participant device 106 to leave a message for client device 104. In certain embodiments, the timing of the prompt may come at the end of a timeout. In some embodiments, the participant device 106 chooses to leave a message and after leaving a message, the communication session is terminated.

After playing a media to participant device 106, at step 608, server(s) 102 determines the reason for the disconnection of client device 104. In certain embodiments, this determination is based on information contained in the database 110. For example, information in database 110 may contain collected parameters that contain data showing a low battery level for client device 104, low signal strength, etc. At step 610, server(s) 102 retrieves the most recent location of client device 104. At step 612, server(s) uses the retrieved location and information from a user profile to determine a second device in close proximity to client device 104. For example, client device 104-1 drops out of a communication session with participant device 106, and server(s) 102 identifies client device 104-3 is the most eligible device to connect to the communication session. In another example, server(s) 102 takes into account the reason for the disconnection of client device 104-1. For instance, after client device 104-1 drops out of a communication session on network 108-1 with participant device 106, server(s) 102 identifies client device 104-1 was in an area of poor signal strength before being dropped from the communication session. So server(s) 102 determines that the reason for the dropped call is a lack of network coverage and then identifies client device 104-3 as the most eligible device to connect to the communication session based on the types of network available in the last location of client device 104-1. Client device 104-3 on network 108-2 may then be selected to join the communication session. At step 614 and step 616, server(s) 102 establishes a connection to the second device and connects the second device to the communication session with participant device 106.

In certain embodiments, at step 614, in order to establish a connection to the second device, server(s) 102 dials the second device. In certain embodiments, the user dials a number with the second device in order to connect to server(s) 102. In certain embodiments, the determination of whether server(s) 102 initiates connection with the second device or the second device initiates connection with server(s) 102 is provided in a user profile associated with the different client devices 104.

In certain embodiments, the nature of client device 104 dictates server(s) 102's connection method. For example, if client device 104-3 is an office landline phone and client device 104-1's last location before the disconnection was in the vicinity of the office building, server(s) 102 would attempt to connect to the office number for user device 104-3. An analogous situation holds for home landline phones if client device 104-1's last location was at home. In certain embodiments, if client device 104-3 is an office computer or home computer, depending on the last known location of client device 104-1, server(s) 102 may attempt a voice or video communication session to either computer. The computers would need to have either a wired or wireless network connectivity and programs that enable voice and/or video communication over such network. In certain instances, the computers are equipped with programs that support text to speech and speech to text, which allow text inputs from client device 104-3 to reach participant device 106 as an audio message and audio messages from participant device 106 to reach client device 104-3 as text messages. The term computer covers the case where client device 104-3 is a mobile device like a tablet computer or a laptop computer with wireless or wired connectivity.

Figure 7:
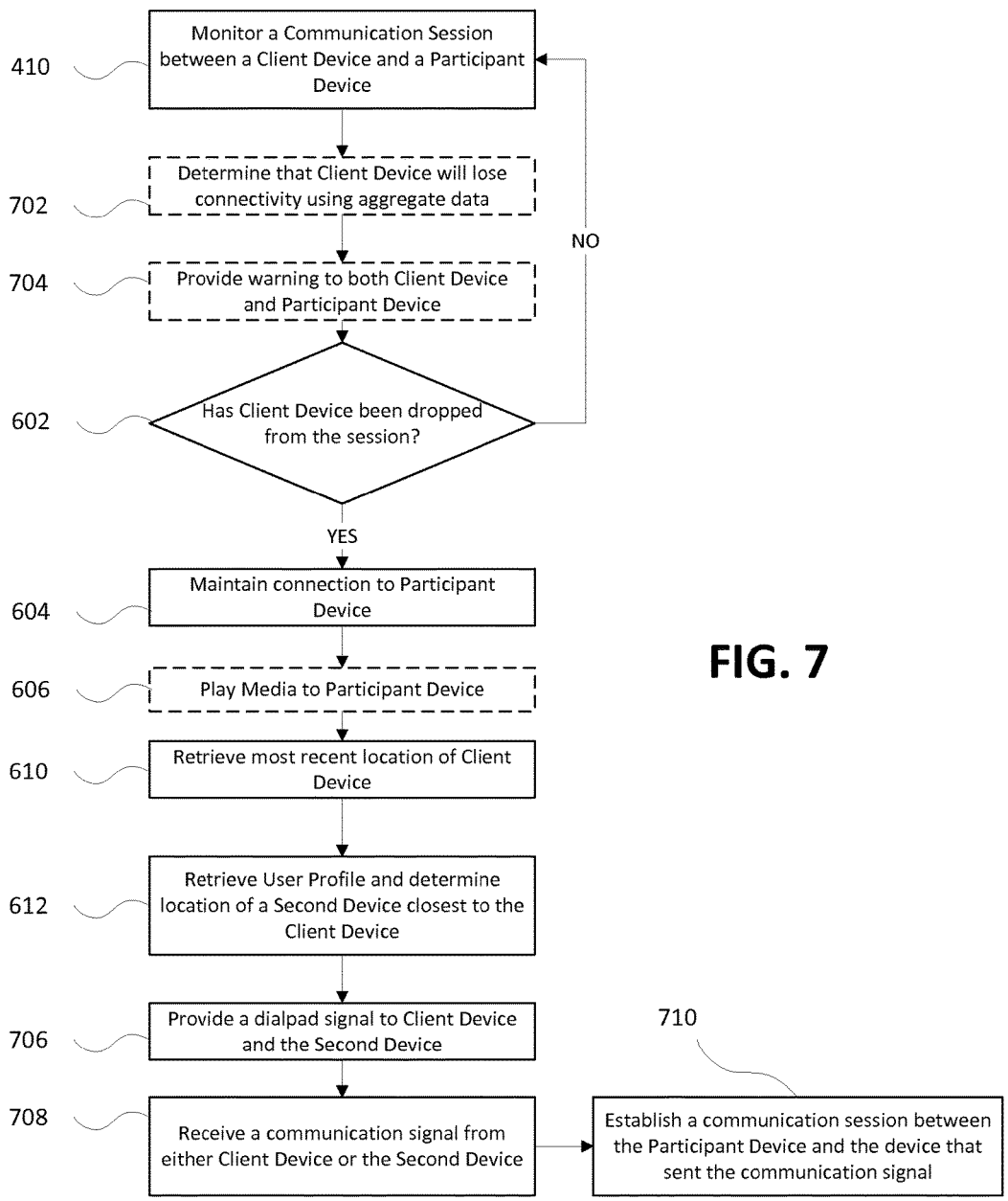
FIG. 7 is a flow diagram of method steps performed by a server or cluster of servers for reconnecting either a second device or a client device with a participant device in accordance with some example embodiments.

FIG. 7 provides a flow diagram of steps performed by a server or cluster of servers for reconnecting either a second device or a client device with a participant device in certain embodiments of the disclosure. In step 410, while server(s) 102 is monitoring the communication session between client device 104 and participant device 106, server(s) 102 may determine in step 702 using aggregated data collected while monitoring the communication session that client device 104 will lose connectivity. This determination or prediction that client device 104 will lose connectivity may be based on historical data. For example, the user using client device 104 usually has spotty reception in a certain area while commuting to work, the user usually loses reception inside his/her work elevator, the user usually has spotty reception at certain parts of his/her home, etc. Using location based data to provide context, the server can collect information over time about user movement patterns and where disconnections to voice conversations usually occur. Additionally, the server can use information regarding mobile network congestion or documented poor network coverage in an area the user is entering in order to determine a probability of client device 104 losing connection.

In certain embodiments, at step 704, server(s) 102 will provide a warning to both client device 104 and participant device 106. The warning may take a form of an audio voice message or audio signals including beeps or sequence of beeps. In certain embodiments, the warning is only provided to client device 104. For example, in the case client device 104 is a non-stationary mobile phone, the warning provided may be directions to the user of client device 104 that will keep client device 104 within an area of decent signal strength. In this example, if the user adheres to the directions, client device 104 will not be allowed to enter an area with low signal strength, therefore, avoiding a disconnection. In certain embodiments, the warning provides an estimated time until the communication session will be interrupted by a disconnection, where the estimated time is based on a distance between the client device 104 and the area of low signal strength and a velocity of the client device 104 computed from its location history. For example, client device 104 may receive a 30 second notice until being disconnected. With advanced warning, the parties in the communication session will have time to decide whether to wrap up the session or whether to hold until the party that is to be disconnected reconnects. In certain embodiments, the warning is a voice message asking the user to plug in client device 104 because the battery charge is low on the mobile device.

At step 602, server(s) 102 determines whether client device 104 has been dropped from the communication session. Steps 604, 606, 610, and 612 proceed as in FIG. 6. In the event client device 104 was dropped from the communication session, server(s) 102 maintains connection to participant device 106, and in some embodiments, plays a media to the participant device 106. Server(s) 102 then retrieves most recent data for client device 104 and information from database 110 including a user profile and selects a second device to connect to the communication session.

At step 706, server(s) provides a dialpad signal to client device 104 and the second device. For example, if client device 104-1 was dropped from the communication session and client device 104-3 is selected as the second device, then server(s) 102 will attempt to send a dialpad signal to both client device 104-1 and client device 104-3. Depending on which device, client device 104-1 or client device 104-3, attempts to connect to server(s) 102, server(s) 102 will receive a communication signal. In certain embodiments, server(s) 102 receives the communication signal from both devices and selects only one of the devices. In certain embodiments, client device 104-3 is not available and server(s) 102 only receives a communication signal from client device 104-1. At step 710, server(s) establishes a communication session between participant device 106 and the selected device.

Figure 8:
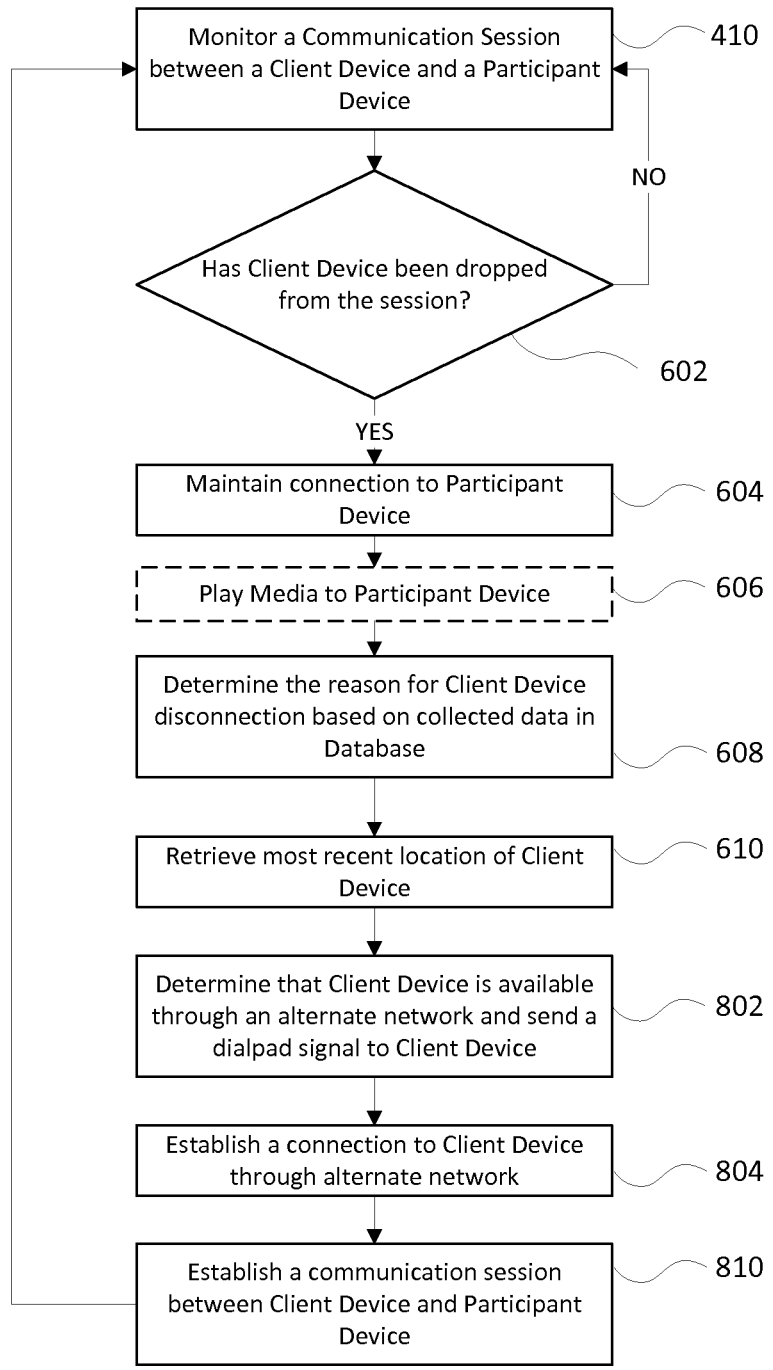
FIG. 8 is a flow diagram of method steps performed by a server or cluster of servers for reconnecting a client device with a participant device through an alternate network in accordance with some example embodiments.

FIG. 8 provides an alternative to FIG. 6-7 in accordance with certain embodiments. FIG. 8 shares steps 410, 602, 604, 606, 608, and 610 with FIG. 6. At step 610, after retrieving the most recent location of client device 104, server(s) 102 determines in step 802 that client device 104 is available through an alternate network and sends a dialpad signal to client device 104 on the alternate network. For example, client device 104-1 was dropped from a communication session with participant device 106 through network 108-2 connection with server(s) 102. Server(s) 102 determines and locates client device 104-1 through network 108-1 and provides a dialpad signal to client device 104-1 using network 108-1. Server(s) then establishes a connection to client device 104-1 through network 108-1 and then joins client device 104-1 to the communication session with participant device 106 at step 810. In certain embodiments, client device 104-1 is communicating over a cellular voice network and becomes disconnected. Through WiFi connectivity, server(s) 102 finds client device 104-1 and attempts to connect to client device 104-1 through the WiFi network. In certain embodiments, client device 104-1 is capable of connecting to multiple cellular networks operated by different cellular network carriers. When client device 104-1 loses connection over a first carrier's cellular network, server(s) 102 connects to client device 104-1 over a second carrier's cellular network. In certain embodiments where server(s) 102 reconnects to client device 104-1 through a different network, client device 104-1 plays the role of the second device or selected device (provided in FIG. 6-7). In FIG. 8, the disconnected client device 104 ends up being the selected device or the second device after server(s) 102 finds client device 104 on an alternate network.

Figure 9:
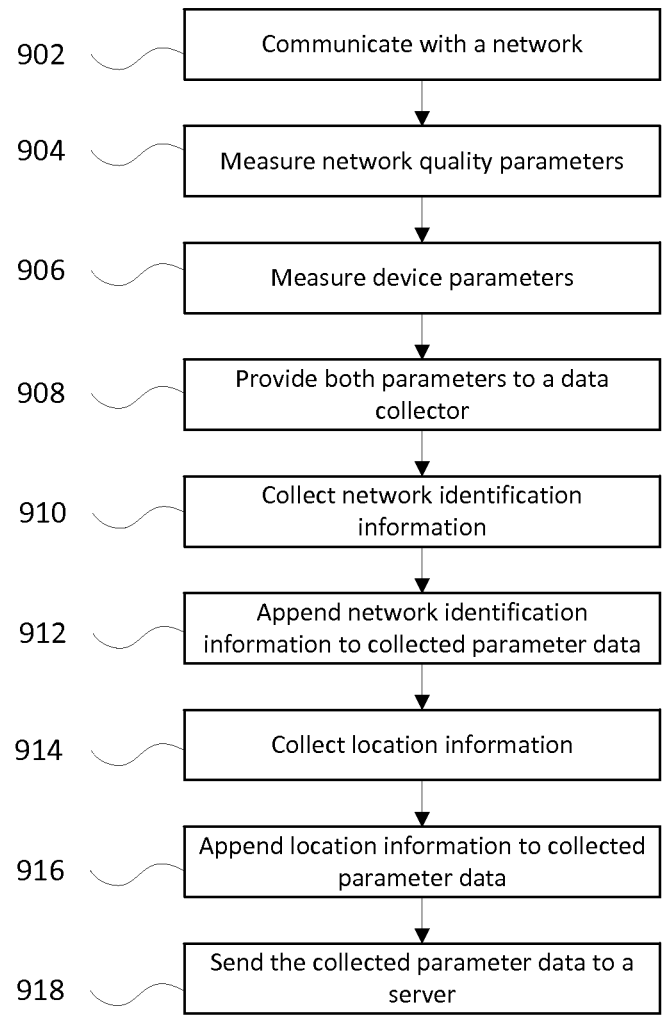
FIG. 9 is a flow diagram illustrating steps performed by a client device for collecting and sending data in accordance with some example embodiments.

FIG. 9 is a flow diagram illustrating steps performed by client device 104 for collecting and sending data to server(s) 102 in accordance with certain embodiments. In order to alleviate the burden of information gathering by server(s) 102, client devices 104 may collect client device and network parameters. At step 902, client device 104 communicates with network 108. At step 904, client device 104 measures network quality parameters from network 108. Network quality parameters may include only a single parameter or a multitude of parameters. For example, the network quality parameters may include at least one of a bit error rate, a signal strength such as a received signal strength indicator (RSSI), a network latency, and network throughput.

At step 906, client device 104 measures device parameters. At step 908, client device 104 provides both parameters to storage devices on client device 104. At step 910, client device 104 collects network identification information, and at step 912, appends the network identification information to collected parameter data in steps 904 and 906. At step 914, client device 104 appends location information to the collected parameter data. At step 918, client device 104 sends the collected parameter data to server(s) 102.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for restoring a communication session between a user and a participant, the method comprising:
   receiving, at a server device, a communication signal from a client device associated with the user to establish a first communication channel between the client device and a participant device associated with the participant;
   in response to receiving the communication signal, establishing, by the server device, the first communication channel through the server device by connecting the server device to the client device via a first network and connecting the server device to the participant device via a second network, the established first communication channel providing the communication session between the client and the participant;
   detecting, by the server device, that the client device has dropped from the first communication channel by detecting that the client device has disconnected from the server device;
   in response to detecting that the client device has dropped from the first communication channel:
      maintaining, by the server device, the connection to the participant device via the second network;
      retrieving, by the server device from a database, a user profile and device statistics associated with the client device; and
      selecting, by the server device, a second device in close proximity to the client device using the user profile and the device statistics retrieved from the database, the second device associated with the user; and
      establishing, by the server device, a second communication channel through the server device by connecting to the second device via a third network and maintaining the connection to the participant device via the second network, the established second communication channel restoring the communication session between the user and the participant.

2. The method of claim 1, further comprising, in response to detecting that the client device has dropped from the first communication channel, providing, by the server device, a media message to the participant device, wherein the media message comprises at least one of a prompt for a voice message from the participant device, an audio message, a text message, or a video message.

3. The method of claim 1, further comprising, in response to detecting that the client device has dropped from the first communication channel, determining, by the server device, a reason that the client device has dropped from the first communication channel, wherein selecting the second device using the user profile and the device statistics retrieved from the database further comprises selecting the second device based on the reason that the client device has dropped from the first communication channel.

4. The method of claim 1, wherein the user profile comprises one or more of a location of the client device, a location of a plurality of devices associated with the user of the client device, or preference settings, and wherein the device statistics comprise one or more of battery life, signal strength, or available networks.

5. The method of claim 1, wherein the device statistics comprise historical information associated with the location of the client device.

6. The method of claim 1, wherein the client device comprises the second device.

7. The method of claim 6, wherein the first network is a first mobile network with a first carrier and the third network is a second mobile network with a second carrier different from the first carrier.

8. The method of claim 1, further comprising, prior to detecting that the client device has dropped from the first communication channel:
determining, by the server device, that the client device is likely to lose connectivity based on at least one of historical information or location data; and
providing, by the server device, a warning to both the client device and the participant device.

9. The method of claim 1, wherein the first network and the third network are different.

10. The method of claim 1, wherein the first network and the third network are the same.

11. A server configured as a central service conducting a communication session and configured to coordinate messages in the communication session, the server comprising at least one network interface configured to communicatively couple a server device to a plurality of communication networks; and at least one processor configured to:
receive a communication signal from a client device associated with a user to establish a first communication channel between a client device and a participant device associated with a participant;
in response to receiving the communication signal, establish the first communication channel through the server device by connecting the server device to the client device via a first network and connecting the server device to the participant device via a second network, the established first communication channel providing the communication session between the client and the participant;
detect that the client device has dropped from the first communication channel by detecting that the client device has disconnected from the server device;
in response to detecting that the client device has dropped from the first communication channel:
maintain the connection to the participant device via the second network;
retrieve, from a database, a user profile and device statistics associated with the client device; and
select a second device in close proximity to the client device using the user profile and the device statistics retrieved from the database, the second device associated with the user; and
establish a second communication channel through the server device by connecting to the second device via a third network and maintaining the connection to the participant device via the second network, the established second communication channel restoring the communication session between the user and the participant.

12. The server of claim 11, wherein the at least one processor, in response to detecting that the client device has dropped from the first communication channel, is further configured to provide a media message to the participant device, wherein the media message comprises at least one of a prompt for a voice message from the participant device, an audio message, a text message, or a video message.

13. The server of claim 11, wherein the at least one processor is further configured to:
in response to detecting that the client device has dropped from the first communication channel, determine a reason that the client device has dropped from the first communication channel, wherein selecting the second device using the user profile and the device statistics retrieved from the database further comprises selecting the second device based on the reason that the client device has dropped from the first communication channel.

14. The server of claim 11, wherein the user profile parameters further comprise one or more of a location of the client device, a location of a plurality of devices associated with the user of the client device, or preference settings.

15. The server according to claim 11, wherein the device statistics comprise one or more of battery life, signal strength, or available networks.

16. The server of claim 11, wherein the at least one processor is further configured to, prior to detecting that the client device has dropped from the first communication channel:
determine that the client device will lose connectivity based on historical information and location data; and
provide a warning to both the client device and the participant device.

17. The server of claim 11, wherein the first network and the third network are different.

18. The server of claim 11, wherein the first network and the third network are the same.

19. A non-transitory computer readable storage device for recovering a communication session between a user and a participant, the computer readable storage device having computer executable instructions for performing the steps of:
receiving a communication signal from a client device associated with the user to establish a first communication channel between a client device and a participant device associated with the participant;
in response to receiving the communication signal, establishing the first communication channel through a server device by connecting the server device to the client device via a first network and connecting the server device to the participant device via a second network, the established first communication channel providing the communication session between the client and the participant;
determining that the client device has dropped from the first communication channel by detecting that the client device has disconnected from the server device;
maintaining the connection to the participant device via the second network;
retrieving, from a database, a user profile and device parameters associated with the client device;
selecting a second device in close proximity to the client device using the user profile and the device parameters retrieved from the database, the second device associated with the user; and
establishing a second communication channel through the server device by connecting to the second device via a third network and maintaining the connection to the participant device via the second network, the established second communication channel restoring the communication session between the user and the participant.

20. The non-transitory computer readable storage device of claim 19, further comprising instructions for performing the steps of, in response to determining that the client device has dropped from the first communication channel, providing a media message to the participant device, wherein the media message comprises at least one of a prompt for a voice message from the participant device, an audio message, a text message, or a video message.

21. The non-transitory computer readable storage device of claim 19, further comprising instructions for performing the steps of, in response to determining that the client device has dropped from the first communication channel, determining a reason that the client device has dropped from the first communication channel, wherein selecting the second device using the user profile and the device parameters retrieved from the database further comprises selecting the second device based on the reason that the client device has dropped from the first communication channel.

22. The non-transitory computer readable storage device of claim 19, wherein the second device comprises the client device.

23. The non-transitory computer readable storage device of claim 19, further comprising instructions for performing the steps of, prior to detecting that the client device has dropped from the first communication channel:

determining that the client device will lose connectivity based on historical information and location data; and providing a warning to both the client device and the participant device.

24. The non-transitory computer readable storage device of claim 19, wherein the first network and the third network are different.

25. The non-transitory computer readable storage device of claim 19, wherein the first network and the third network are the same.

* * * * *